May 21, 1940.  V. W. KLIESRATH  2,201,777
MANUFACTURE OF BURNER ELEMENTS
Filed Jan. 6, 1938
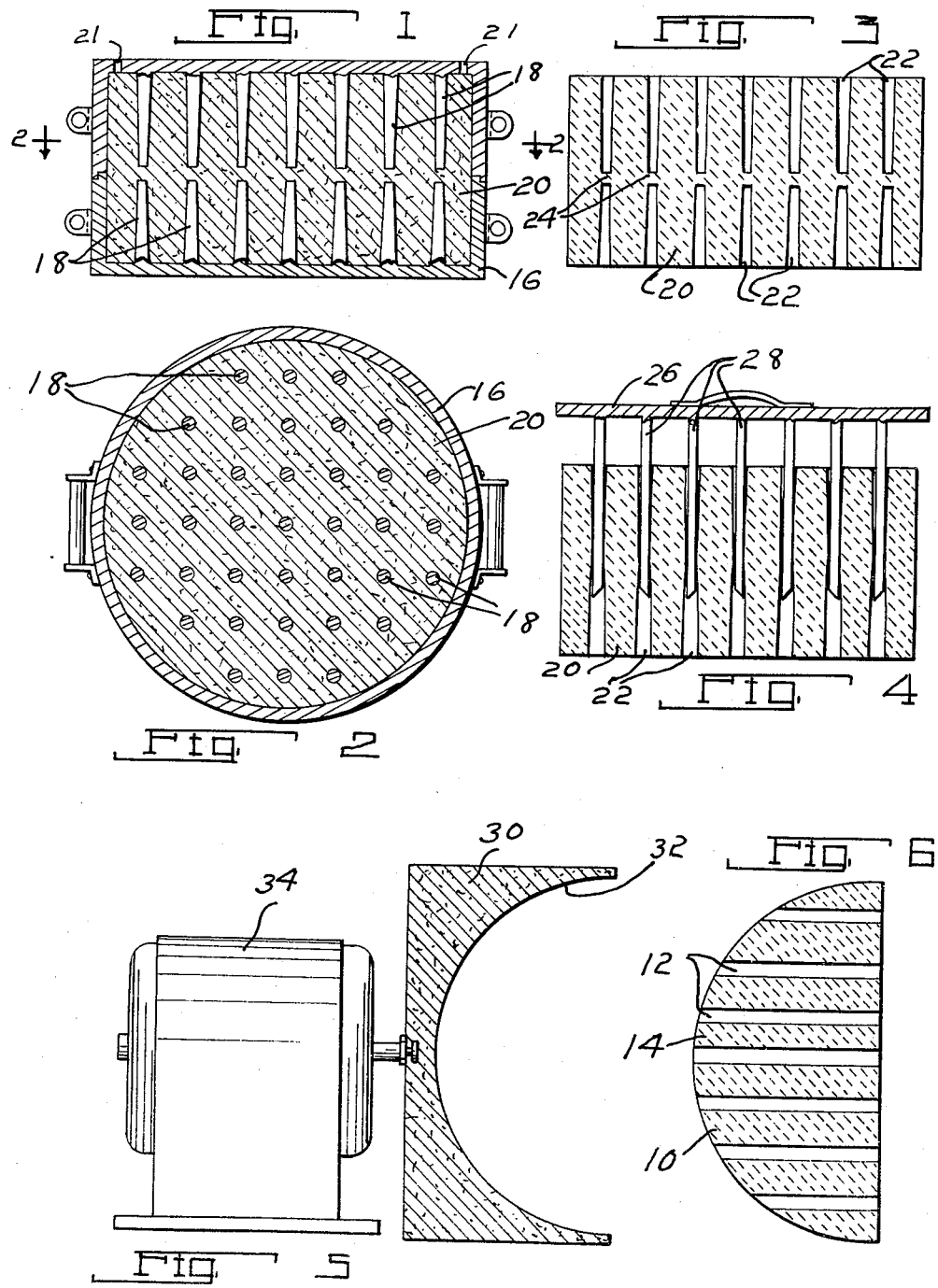
INVENTOR.
VICTOR W. KLIESRATH
BY McConkey Davison & Booth
ATTORNEYS.

Patented May 21, 1940

2,201,777

UNITED STATES PATENT OFFICE 2,201,777

MANUFACTURE OF BURNER ELEMENTS

Victor W. Kliesrath, South Bend, Ind., assignor to International Engineering Corporation, Chicago, Ill., a corporation of Illinois Application January 6, 1938, Serial No. 183,623

1 Claim. (Cl. 25—156)

This invention relates to molds and molding methods and more particularly to the molding of refractory articles such as porous refractory burner elements or the like.

In the molding of refractory articles a great deal of difficulty has been encountered due to the fact that the pasty mix employed has very little strength before firing and is quite apt to be damaged when being removed from the mold or handled prior to firing. This is particularly true when handling perforated burner elements of the type to which the present invention particularly relates.

It is accordingly one of the objects of the present invention to provide a method of making refractory articles in which possibility of damage to the material in its unfinished stages is reduced to the minimum.

Another object of the invention is to provide a method of making refractory articles in which the article is first molded and fired and is then given the desired shape by grinding or the like.

Still another object of the invention is to provide a novel mold adapted for molding refractory perforated articles in which pins employed to form the perforations are of minimum length. Preferably the pins are so arranged as to form a central transverse web centrally of the molded material to reinforce the material during handling.

Various other objects, advantages and novel features of the invention will be apparent from the following detailed description when read in connection with the accompanying drawing, in which:

Figure 1 is a central section through a mold;

Figure 2 is a section on the line 2—2 of Figure 1;

Figure 3 is a section of a molded block;

Figure 4 is a section similar to Figure 3 illustrating a punching step;

Figure 5 is a section with parts in elevation of a grinder; and

Figure 6 is a central section of a finished burner element.

In practicing the invention a suitable refractory substance such as kaolin, diatomaceous earth, alundum or the like is mixed with water to form a paste. To make the product porous a combustible or volatile substance such as sawdust, wood lint, straw, and/or naphthaline may be incorporated in the paste. The paste may be molded to any desired shape and then fired in a kiln to harden the refractory material and burn out the combustible or volatile substance, leaving a porous refractory mass.

The invention has been illustrated in connection with the making of a refractory element 10 for an oil burner. As shown, the element 10 is formed with a series of longitudinal holes 12 and has one face in the form of a semi-sphere as indicated at 14.

If it is attempted to mold element 10 directly, a great deal of difficulty is encountered due to the length of the pins required to form the holes 12 and to the relatively thin edges which will be damaged easily. These difficulties are overcome according to the present invention by providing a substantially rectangular split mold 16 each half of which carries a series of pins 18 so arranged that when the mold is assembled the pins are in alinement. Preferably the pins 18 are slightly tapered so they may be withdrawn more easily from the material. As shown, the top half of the mold is provided with vents 21 for the escape of water vapor or volatile material.

According to an important feature of the invention the pins are of such length that their ends are spaced as shown when the mold is assembled. Thus the openings formed by the pins will be interrupted at their centers by a web of material which serves to strengthen the molded block during handling and firing and at the same time the pins are so short that they can easily be withdrawn from the paste.

A refractory paste mixture is placed in the mold as indicated at 20 and the mold is closed and placed in a warm current of air to dry the paste. After the paste mixture has dried the mold is removed leaving a substantially cylindrical block of material with oppositely disposed openings 22 interrupted by a web 24, as shown in Figure 3. This block is fired in a kiln or the like at a temperature of from 2300° to 2800° F. to convert the silica in the mix to tridymite, to fuse the fluxes, etc. During this operation the combustible material is completely burned out, leaving a porous block of refractory material of the shape shown in Figure 3. At this time the material is quite hard and the danger of damaging it by handling has passed.

The web 24 may be removed by a tool of the type illustrated in Figure 4 comprising a plate 26 having a series of punch rods 28 corresponding in number and spacing to the holes 22. In use the punch rods 28 are placed in the holes 22 and pressed to punch out the web 24 and connect the alined holes 22. The material is then in the form of a substantially cylindrical block with a series of parallel holes extending completely through it.

The final step in the operation is shaping the block to the desired configuration and for this purpose there is illustrated a grinding wheel 30 having one face formed with a semi-spherical cavity 32 and driven by a suitable motor 34. With the motor running the block 20 is pressed into the cavity to grind off one face thereof to a semi-spherical shape. This completes the burner element 10 as shown in Figure 6, it being noted that the final shape in which the edges are relatively thin is not produced until after the material is fired and is relatively strong.

While only one method according to the invention has been described in detail, it will be understood that many variations might be devised, and it is not intended to limit the scope of the invention to the exact method described nor otherwise than by the terms of the appended claim.

What is claimed is:

The method of making perforated refractory articles which comprises forming a paste of refractory material, placing the paste in a mold having series of oppositely disposed pins pairs of which are alined with each other and with their ends spaced apart to leave a web substantially centrally of the material, drying the material in the mold, separating the mold in the plane of the web, removing the material from the mold and firing it, and thereafter punching out the material of said web between the alined sockets formed by each pair of pins.

VICTOR W. KLIESRATH.